United States Patent [19]
Romanchik et al.

[11] Patent Number: 5,273,073
[45] Date of Patent: Dec. 28, 1993

[54] CONTROL VALVE FOR A PARTICULATE BLENDER

[75] Inventors: Robert E. Romanchik, Allentown; Marvyn L. Souders, Orefield, both of Pa.

[73] Assignee: Fuller Company, Bethlehem, Pa.

[21] Appl. No.: 837,191

[22] Filed: Feb. 14, 1992

[51] Int. Cl.$^5$ .......................................... F16K 11/085
[52] U.S. Cl. .......................... 137/625.47; 137/625.46; 251/59
[58] Field of Search ...................... 137/625.47, 625.46; 251/59

[56] References Cited

U.S. PATENT DOCUMENTS 3,499,467  3/1970  McCord et al. ............ 137/625.47 X
4,669,503  6/1987  McGarrity et al. ........ 137/625.47 X

*Primary Examiner*—Arnold Rosenthal
*Attorney, Agent, or Firm*—Daniel DeJoseph

[57] ABSTRACT

A control valve for a particulate material blender which permits either blending or bypassing with pressurized gas or discharging the material without pressurized gas, but prevents undesirable interconnections. A cylindrical body with four access ports spaced around the body has a rotor with connecting passages within the body. In one embodiment, the rotor interconnects either the gas entry port to the blender port alone, the gas entry port to the blender and bypass ports, or the blender port to the discharge port as it rotates into one of its three positions. A suitable rotation means, for example, two rotary actuators, are used to secure the three positions of the valve, while preventing any other rotational positions.

4 Claims, 4 Drawing Sheets

CONTROL VALVE FOR A PARTICULATE BLENDER

BACKGROUND OF THE INVENTION

This invention deals generally with blenders for solid particulate matter, and more specifically with a selection control valve for blenders of the type which are vessels with a central lift column or pipe through which a gas is pumped to move material from the bottom to the top of the vessel for mixing.

Particulate blenders which are cylindrical vessels with central lift columns to raise bottom material to the top for mixing are well known in the art. They are available in versions which feed the new material into the vessel at either the bottom or the top of the vessel, and both types use a gas pumped up through the central pipe to lift material from the bottom to the top. The control valves for such blenders generally consist of several flow cutoff valves of a simple structure with each valve merely stopping or permitting flow through it.

Typically, one such valve is used to control the discharge of material out of and the entry of pressurized gas into the blender at a switching system at the bottom of the blender. A second valve is generally used to control the entry of gas into the switching system. A third valve is used to control the discharge of material from the switching system, and a fourth valve permits gas or particulate material to be fed into a bypass pipe which interconnects the bottom of the blender with the top of the blender or some other equipment. If the switching system is thought of as an enclosure with valved pipes on four sides, the pipe and valve on the top of the enclosure connect to the bottom of the blender; the pipe and valve on the bottom of the enclosure connect to the discharge pipe; the pipe and valve on one side of the enclosure connect to a source of pressurized gas, or to a source of gas mixed with particulate material; and the pipe and valve on another side of the enclosure connect to a bypass pipe going to the top of the blender or other processing equipment. With such an arrangement, it is possible for the operator to make several interconnections and select multiple operations. Clearly, with all valves closed neither blending, bypassing nor discharge are taking place. Other possibilities include: (1) with only the bottom blender valve and the gas valve open, gas is fed into the bottom of the blender, and mixing of material occurs within the blender; (2) with only the bottom blender valve and the discharge valve open, discharging of material from the blender takes place; and (3) with only the gas and bypass valves open, gas or gas and particulate material can be fed to the top of the blender. Unfortunately, however, in each of these control circumstances there is always the possibility that one or more other valves may also be opened accidentally, and that possibility can lead to the discharge of improperly mixed material. Furthermore, the use of multiple independent valves not only makes the system complex to construct and to control, but it also is quite costly and the multiple valves decrease the reliability of the system.

SUMMARY OF THE INVENTION

The present invention eliminates the complexity and confusion of multiple valves by replacing three of the previous control valves with a single three position, power operated valve which performs all of the functions of the previous valves, but also prevents the inadvertent opening of the various pipes at improper times. Only the blender bottom valve of the previously used arrangement remains for its function of cutting off all material flow out of the blender.

The valve of the preferred embodiment of the invention includes four openings or ports to which pipes can be connected and a rotor which, depending upon which one of its three positions is selected, opens only two or three of the four ports while closing off the others. Moreover, the rotor motion is restricted and the ports are located so that certain ports can not be opened together. For instance, the gas entry port and the discharge port can not both be open at the same time.

The body of the valve is essentially a cylinder with closed ends and with the four ports opening through the cylindrical surface. The ports are located with spacings around the cylinder, wherein the precise location of said ports can vary, so that the rotor, which has passages through it, interconnects different ports depending upon the position of the rotor. Since, as previously described, the valve arrangement is usually below the bottom of the blender, it is convenient to describe the orientation of the preferred embodiment of the invention in relation to the blender port, which is generally located at the top of the three position valve.

In one preferred embodiment, the blender port and the qas entry port are located in the same quadrant of the cross section of the cylindrical valve body, with the blender port being located near the top of the cylindrical body. The bypass port is located on the side of the cylinder opposite from the gas entry port, and the discharge port is located near the bottom of the cylindrical surface. In terms of a hypothetical clock face, the gas entry port is located 9 o'clock, the blender port near 11 o'clock, the bypass port near 2 o'clock and the discharge port near 4 o'clock, although it is of course understood that the precise location of each port can vary according to the specific embodiment of the invention being practiced. The actual orientation of the various ports must take into account the diameter of the ports themselves and the dimensions of the rotor.

The rotor within the valve body is a partial cylinder with one or more openings within it so that there can be three different positions for the valve rotor, with each of the positions interconnecting specific ports. In one embodiment of the present invention, one such position interconnects the gas entry and blender ports and blocks the bypass and discharge ports. When the rotor is turned approximately 90 degrees to a second position, the gas entry, blender and bypass ports are interconnected while the discharge port remains blocked. A further rotation of approximately 90 degrees to the third position closes the gas entry and bypass ports and opens the discharge port, but leaves the blender port open. The design of the valve operating system permits no further rotation and requires reverse rotation to reposition the valve into the second or first positions. This restricted rotation is accomplished in one embodiment of the invention by the use of two stacked rotary actuators, so that one rotary actuator rotates the valve rotor shaft, while the second rotary actuator rotates the first rotary actuator. By this means either one or two rotation steps can be secured, but further rotation is not available. It is appreciated that other methods to provide for the proper rotation of the rotor are within the scope of the present invention. It can therefore be appreciated that the present invention attains the same interconnection capabilities as three conventional valves, but does so without the control complications, with greater reliability and with no possibility of interconnecting ports at an improper time.

DETAILED DESCRIPTION OF THE INVENTION

Figure 1:
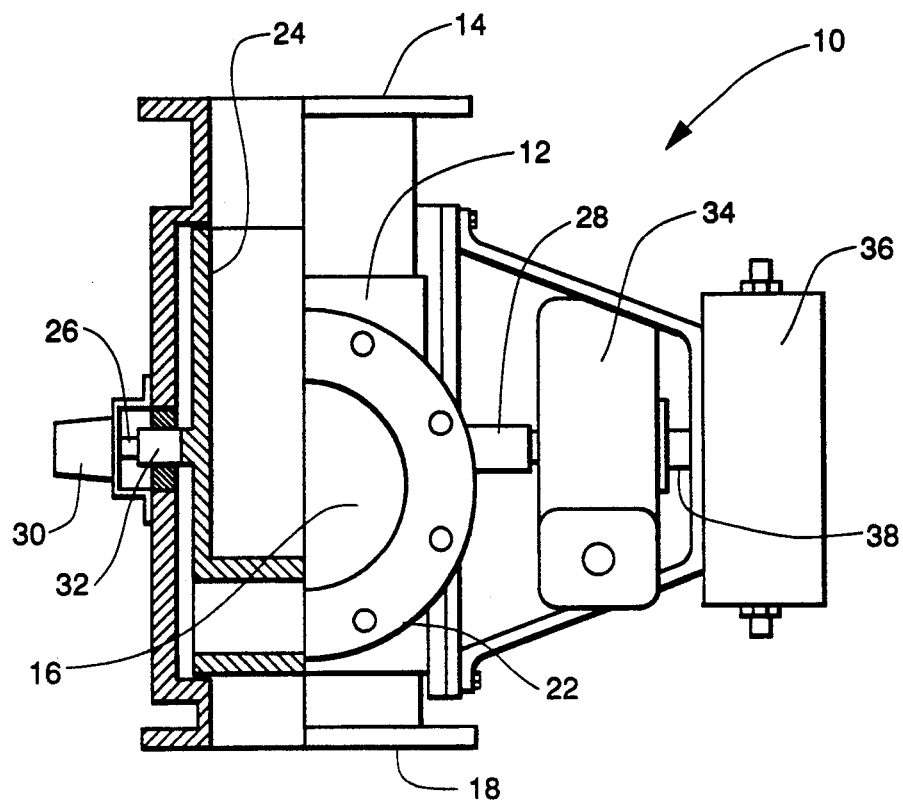
FIG. 1 is a partial cross section side view of one embodiment of the valve of the invention.
Figure 2:
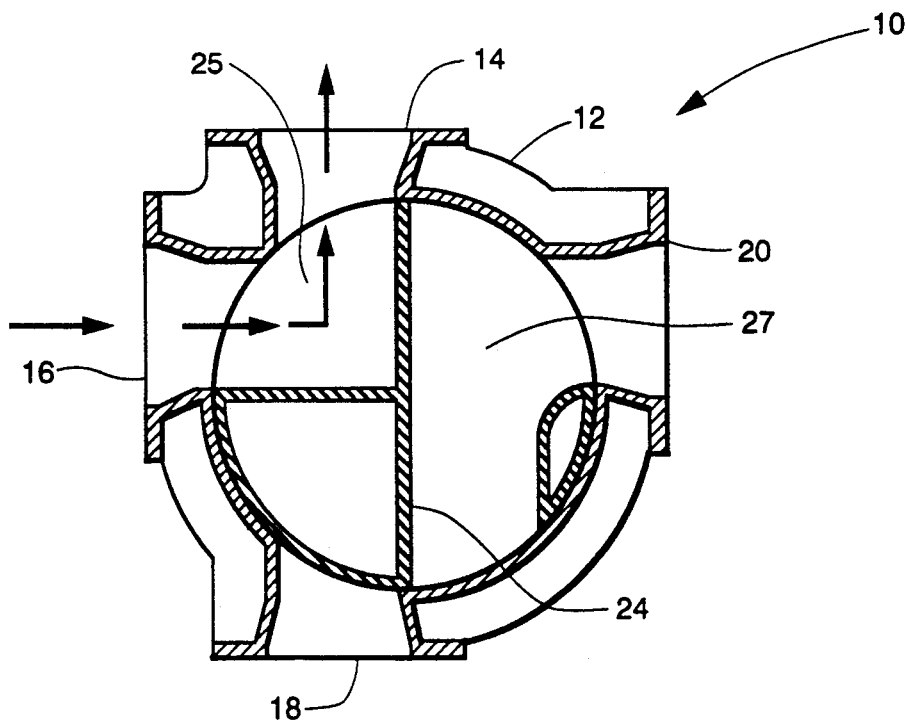
FIG. 2 and 5 are schematic cross section diagrams of two embodiments of the invention with the valve in the blend position.
Figure 3:
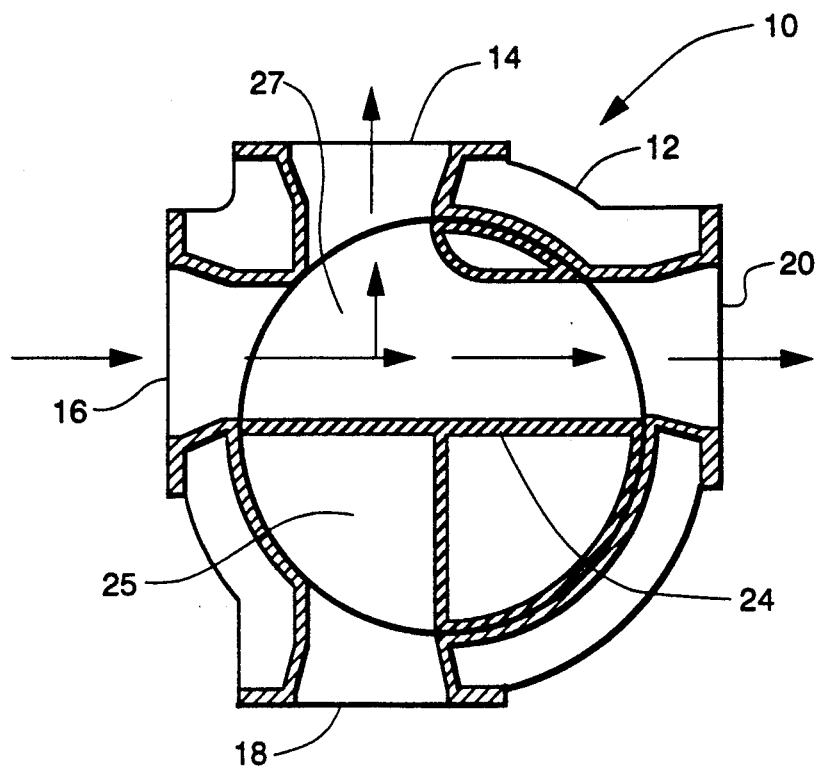
FIG. 3 and 6 are schematic cross section diagrams of two embodiments of the invention with the valve in the bypass position.
Figure 4:
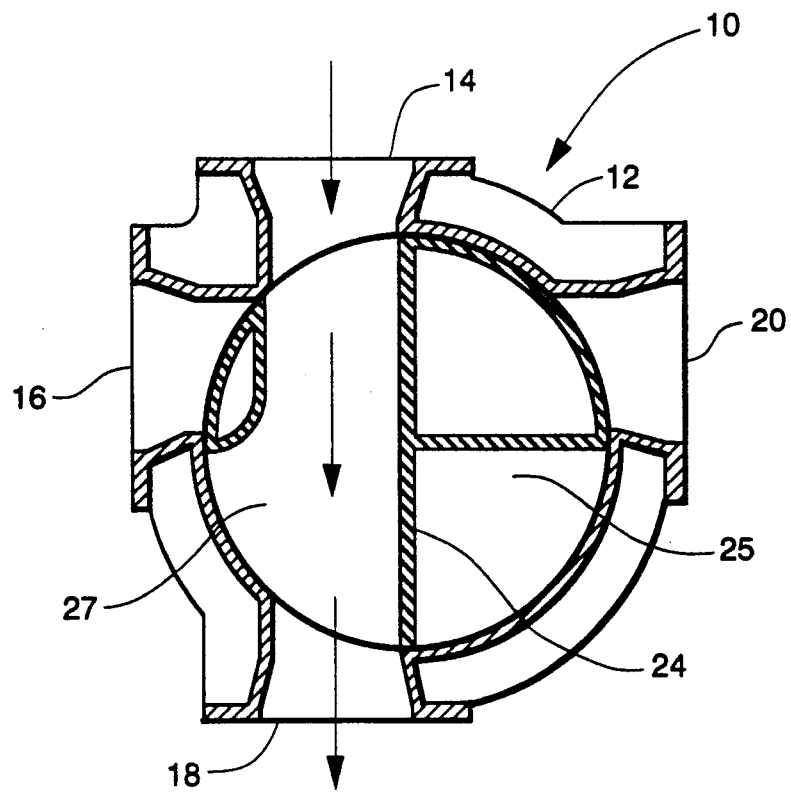
FIG. 4 and 7 are schematic cross section diagrams of two embodiments of the invention with the valve in the discharge position.

FIG. 1 is a partial cross section side view of one embodiment of blending control valve 10 of the invention in which valve body 12 is shown with only three ports 14, 16 and 18 visible. Blender port 14 is to be connected to the bottom of the blender (not shown), discharge port 18 is for connection to a discharge pipe (not shown), and gas entry port 16 is for connection to a pressurized gas source or a source of pressurized gas and particulate material (also not shown). Bypass port 20 is shown in FIGS. 2, 3 and 4, but is not visible in FIG. I. Each of the four ports is constructed with a conventional connecting flange 22, such as that shown at port 16, which permits interconnecting the port to its associated equipment by the use of conventional nuts and bolts (not shown).

Valve rotor 24 is shown in cross section in FIG. 1 within valve body 12, and is supported for rotational movement by shafts 26 and 28 which are supported by bearings such as end bearing 30 and through bearing 32.

The rotation of rotor 24 is powered, controlled and restricted by rotary actuators 34 and 36. Since three specific positions are required for rotor 24 in order for valve 10 to operate properly, and because full rotation is not desirable, rotary actuators 34 and 36 are arranged in an unusual manner. Primary rotary actuator 34 is conventionally attached to shaft 28 which turns rotor 24, and therefore furnishes two positions for rotor 24, one at each extreme of the motion of rotary actuator 34.

Secondary rotary actuator 36 is not, however, also directly attached to rotor 24. Instead, secondary rotary actuator 36 is attached to shaft 38 which is attached to and rotates the body of primary rotary actuator 34.

It should be understood that rotary actuators 34 and 36 are both of the type which rotate the shaft to which they are attached through a predetermined angle and then stop. They can also be rotated through that same angle in the reverse direction, but no greater or lesser rotations are available. Thus rotary actuators 34 and 36 are each only two position devices. Nevertheless, the configuration in which they are used for blending control valve 10 furnishes three, and only three, specific positions for rotor 24.

Assuming, for example, that both actuators 34 and 36 start in their full counter clockwise positions when looking at valve 10 from the right hand side of FIG. 1.

Then, when actuator 34 is activated, it rotates shaft 28 clockwise through the full angle of rotation of actuator 34. Also, when actuator 36 is activated, it rotates actuator 34 clockwise through the full angle of rotation of actuator 36, thereby also rotating shaft 28 an additional clockwise amount equivalent to the rotation caused by actuator 36.

The rotation available for shaft 28 is therefore composed of two distinct segments, one segment derived from rotary actuator 34 and the other segment derived from rotary actuator 36. These two segments may or may not be equal, and they can be selected to move rotor 24 of valve 10 into the exact positions required to provide the change of flow through valve 10 which is desired.

The three positions required for rotor 24 within valve 10 are shown in FIGS. 2, 3 and 4, all of which are schematic cross section diagrams of valve 10 taken across the axis of rotor 24. The interior of valve body 12 is shaped generally as a cylinder with its axis into the plane of FIGS. 2, 3 and 4, and rotor 24 is a partial cylinder with its outside curved surface in close proximity to the inside curved surface of the interior of valve body 12 and its axis parallel to the axis of valve body 12. Conventional sealing means (not shown) is used to prevent leakage of gas or particulate material between the curved surfaces and the ends of rotor 24 and valve body 12.

FIG. 2 depicts the position of rotor 24 in valve 10 when valve 10 is set to the blend position. Typically, this would be with rotary actuators 34 and 36 both set to the same direction of their rotations. With rotor 24 set as shown in FIG. 2, gas or gas and particulate material flow enters gas entry port 16 and flows up through rotor passage 25 into blender port 14 into the blender (not shown), where it causes the mixing of the particulate material within the blender. Discharge port 18 and bypass port 20 are both closed off from the flow by rotor 24 and have no affect on the flow.

FIG. 3 shows the position of rotor 24 when valve 10 is set to the bypass position. This would usually be accomplished by operating primary rotary actuator 34 so that it rotates rotor 24 into position. With rotor 24 set as shown in FIG. 3, gas and particulate material entering gas entry port 16 can flow through passage 27 in rotor 24 into either blender port 14 or bypass port 20. However, if true bypassing is desired, the blender's own cutoff valve (not shown) is closed, and therefore flow will only occur from gas entry port 16 to bypass port 20. Discharge port 18 remains blocked by rotor 24 and does not affect this flow.

FIG. 4 shows the position of rotor 24 when valve 10 is set in the discharge position. This is accomplished by activating secondary rotary actuator 36 so that the rotation of actuator 36 is added to the rotation of actuator 34 which previously located rotor 24 in the position shown in FIG. 3. With rotor 24 set in the position shown in FIG. 4, gas entry port 16 and bypass port 20 are blocked off by rotor 24, but discharge port 18 is open to blender port 14 through passage 27. This permits material within the blender to flow down through blender port 14 and out of valve 10 through discharge port 18.

Figure 6:
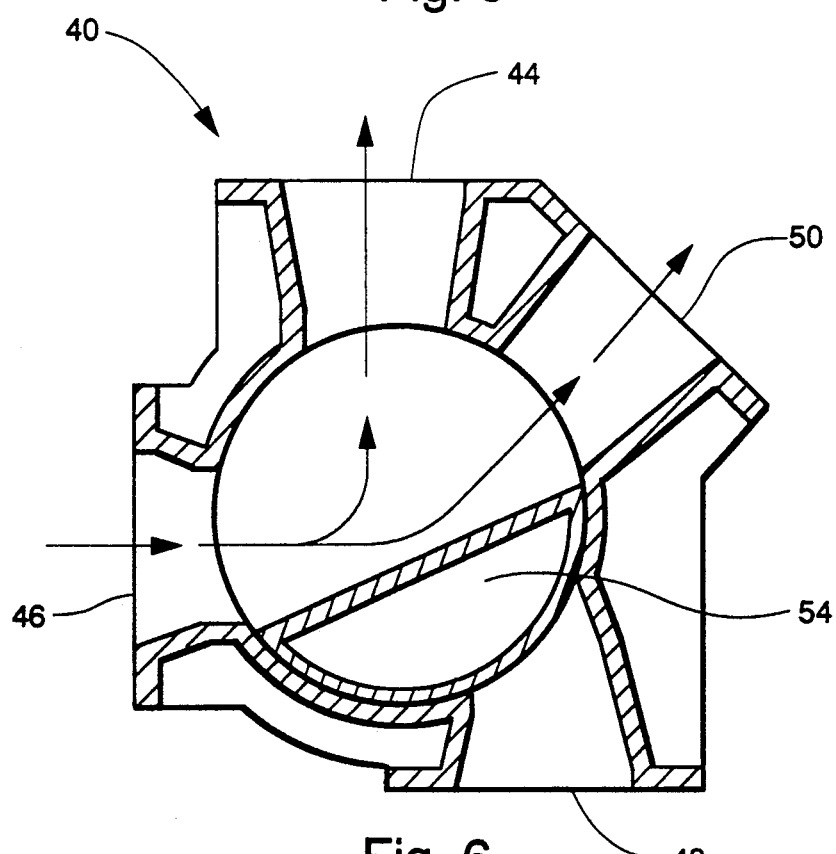
Figure 7:
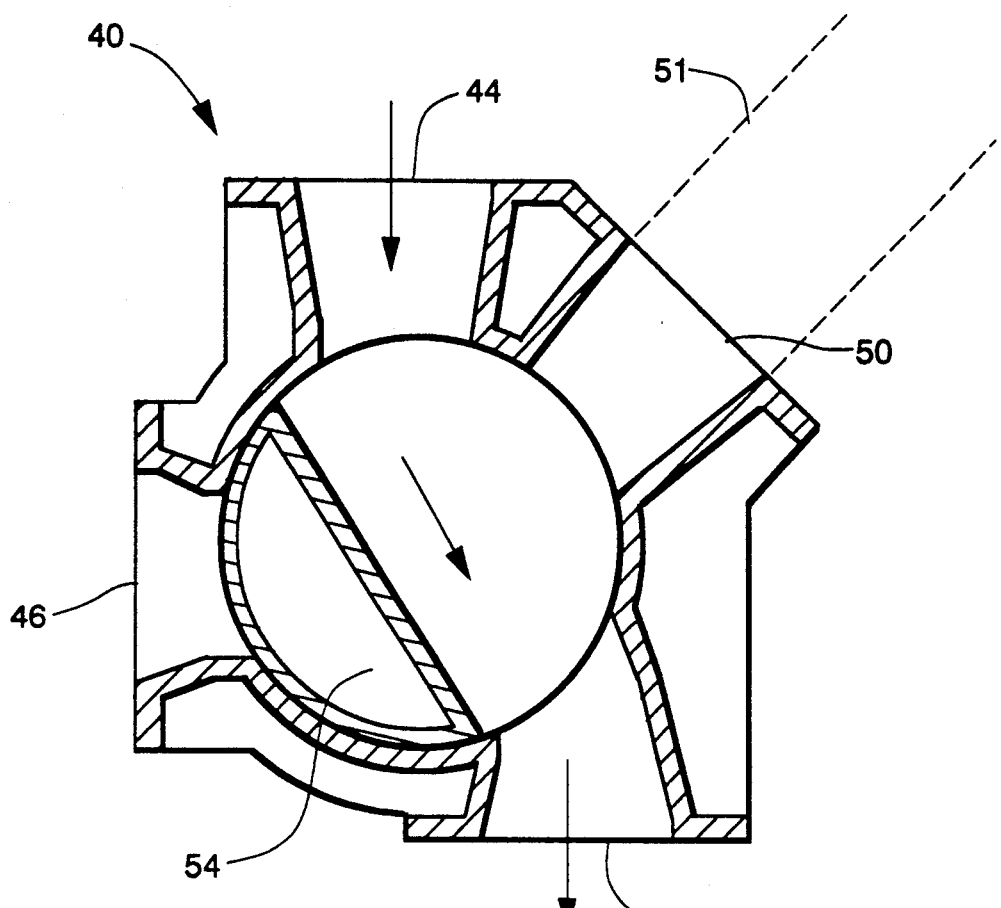
Figure 8:
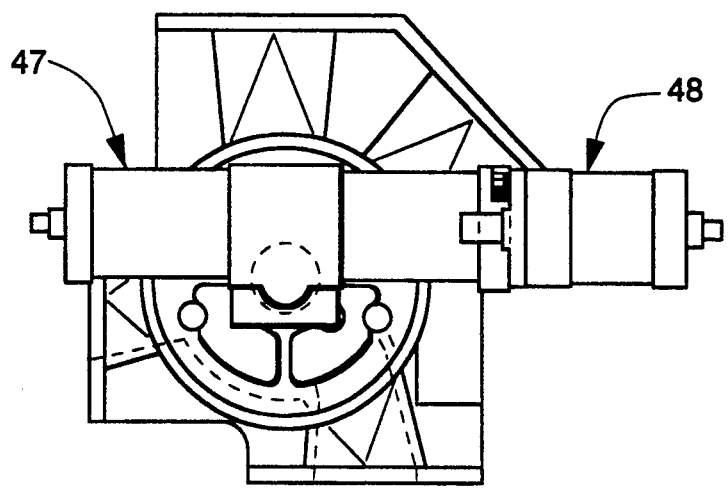
FIG. 8 is a cross section of another embodiment of the valve of the present invention.

FIG. 5-8 display another embodiment of the valve of the present invention. In the embodiment depicted, the rotor is operated via a pneumatic rotary actuary 47 which is operated in conjunction with air cylinder 48 as shown in FIG. 8.

Figure 5:
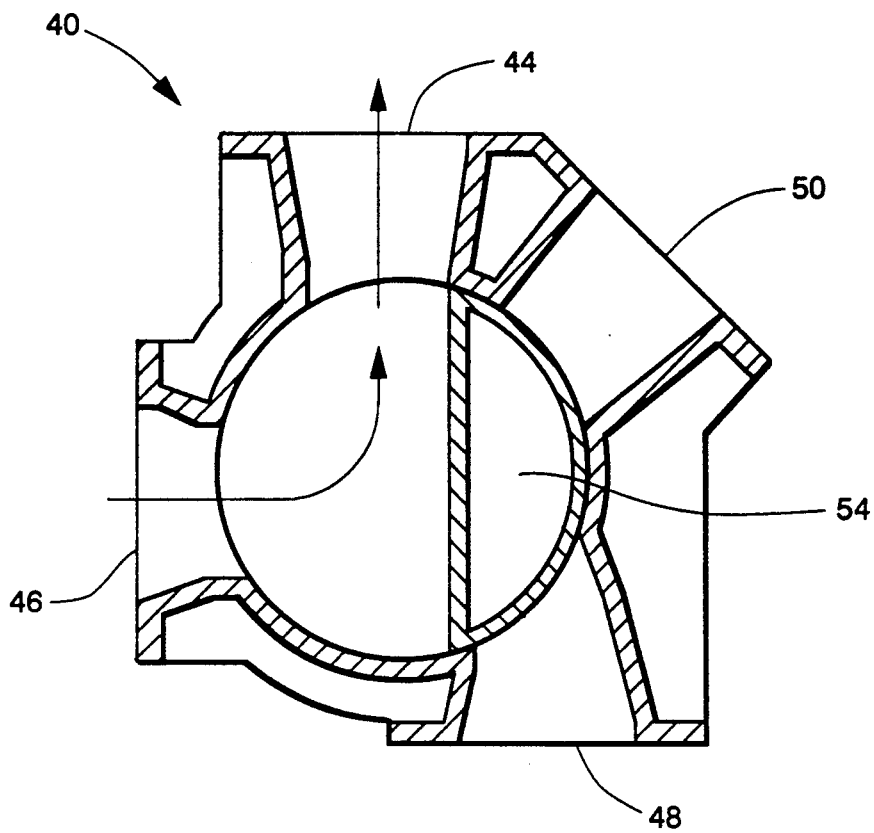

FIG. 5 depicts the position of rotor 54 in valve 40 when valve 40 is set to the blend position. With rotor 54 set as shown in FIG. 5, gas or gas and particulate material flow enters gas entry port 56 and flows up into blender port 54 into the blender (not shown), where it causes the mixing of the particulate material within the blender. Discharge port 48 and bypass port 50 are both closed off from the flow by rotor 54 and have no affect on the flow.

FIG. 6 shows the position of rotor 54 when valve 40 is set to the bypass position. With rotor 54 set as shown in FIG. 6, gas and particulate material entering gas entry port 46 can flow into either blender port 44 or bypass port 50. Discharge port 48 remains blocked by rotor 54 and does not affect this flow.

FIG. 7 shows the position of rotor 54 when valve 40 is set in the discharge position. With rotor 54 set in the position shown in FIG. 7, gas entry port 46 is blocked off by rotor 54, but discharge port 48 and bypass port 50 are open to blender port 44. This permits material within the blender to flow down through blender port 44 and out of valve 40 through discharge port 48, and, in addition, permits material to drain from bypass line 51 through bypass port 50, which is a particular feature of this embodiment of the present invention.

As can be appreciated from the above description, the valve of the present invention performs all the functions of the three valves of the prior art, and does so with a simple structure. Moreover, because the means to provide for rotational movement, such as the rotary actuators, can not position the rotor in any locations other than those shown, the valve of the invention prevents the undesirable interconnection of the gas entry port or bypass port to the discharge port.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, the several ports can be located at other angles to each other, as long as the positions of the rotor are selected to interconnect or block the appropriate ports for proper functioning. Moreover, the portions of the rotor without passages could be either solid or hollow.

What is claimed as new and for which Letters Patent of the United States are desired to be secured is:

1. A control valve for a particulate blender comprising:
   a valve body with a cylindrical interior chamber;
   a gas entry port opening into the interior chamber of the valve body;
   a blender port separated from the gas entry port and opening into the interior chamber of the valve body;
   a bypass port separated from the gas entry port and the blender port and opening into the interior chamber of the valve body;
   a discharge port separated from the gas entry port, the blender port and the bypass port and opening into the interior chamber of the valve body;
   a rotor located and rotatable within the interior chamber of the valve body; the rotor including a first passage which, when the rotor is in a first position, interconnects only the gas entry port to the blender port; the rotor also including a second passage which, when the rotor is in a second position, interconnects only the gas entry port, the blender port and the bypass port, with the second passage, when the rotor is in a third position, interconnecting only the blender port and the discharge port; and rotation means, interconnected with and capable of rotating the rotor into only the first, second and third positions of the rotor.

2. The valve of claim 1 wherein the rotation means is a first rotary actuator and a second rotary actuator, the first rotary actuator attached to an-d rotating a shaft which is attached to the rotor and upon which the rotor rotates, and the second rotary actuator attached to and rotating the first rotary actuator.

3. A control valve for a particulate blender comprising:
   a valve body with a cylindrical interior chamber;
   a gas entry port opening into the interior chamber of the valve body;
   a blender port separated from the gas entry port and opening into the interior chamber of the valve body;
   a bypass port separated from the gas entry port and the blender port and opening into the interior chamber of the valve body;
   a discharge port separated from the gas entry port, the blender port and the bypass port and opening into the interior chamber of the valve body;
   a rotor located and rotatable within the interior chamber of the valve body; wherein, when the rotor is in a first position, only the gas entry port and the blender port are interconnected; when the rotor is in a second position, only the gas entry port, the blender port and the bypass port are interconnected; and, when the rotor is in a third position, only the blender port, the bypass port and the discharge port are interconnected; and rotation means, interconnected with and capable of rotating the rotor into only the first, second and third positions of the rotor.

4. The valve of claim 3, wherein the rotation means is a pneumatic rotary actuary.

* * * * *